United States Patent [19]
Won et al.

[11] Patent Number: 5,266,918
[45] Date of Patent: Nov. 30, 1993

[54] SERIAL COMPARATOR

[75] Inventors: Dae S. Won; Jun S. Hwangbo, both of Seoul; Jae Y. Do, Suweon, all of Rep. of Korea

[73] Assignee: Samsung Electronics, Co., Ltd., Suweon, Rep. of Korea

[21] Appl. No.: 779,940

[22] Filed: Oct. 21, 1991

[30] Foreign Application Priority Data

Aug. 16, 1991 [KR] Rep. of Korea ............... 91-14125

[51] Int. Cl.$^5$ .............................................. G06F 7/02
[52] U.S. Cl. ................................................ 340/146.2
[58] Field of Search ............. 364/728.03, 769, 715.06; 340/146.2

[56] References Cited

U.S. PATENT DOCUMENTS

| | | | |
|---|---|---|---|
| 3,660,823 | 5/1972 | Recks | 340/146.2 |
| 4,410,960 | 10/1983 | Kasuya | 340/146.2 X |
| 4,567,572 | 1/1986 | Morris et al. | 340/146.2 X |
| 4,935,719 | 1/1990 | McClure | 364/769 X |

Primary Examiner—Jerry Smith
Assistant Examiner—C. Ngo
Attorney, Agent, or Firm—Ladas & Parry

[57] ABSTRACT

A serial comparator for comparing serially input data values with an internal data value in order to determine a command implementation requirement, having NOR gates for logic-adding two input data under the control of an output value obtained through an exclusive NOR gate, an inverter and a NAND gate, two latching circuits for latching the output from the NOR gate, two inverters for inverting the outputs from the latching circuits, and a NOR gate for outputting the equivalent value out of the inverted outputs from the two inverters, to output the lowermost bit value as a feedback to the NAND gate so as to output the uppermost address bit value. Accordingly, even in the case where the bit numbers of the input data and the internal data are variable, the operating characteristic becomes adapted to the semiconductor in which the input or output is carried out serially.

9 Claims, 3 Drawing Sheets

SERIAL COMPARATOR

FIELD OF THE INVENTION

The present invention relates to a serial magnitude comparator for comparing serially input data values with internal data values in order to determine a command implementation requirement, and more particularly to, a serial comparator for discriminating the magnitudes of the values of the input data having variable bit numbers obtained by comparing bit by bit.

BACKGROUND OF THE INVENTION

Generally, a conventional TTL type ($\times 8$, $\times 16$) magnitude comparator which is intended to determine the validity and magnitudes of a plurality of serially input data, is capable of comparing only fixed data having a preset bit number.

FIG. 1 illustrates a conventional logic circuit for comparing and outputting only the fixed data after receipt of serially input data.

First, 9-bit input data is added in an adder 10 consisting of a half adder HA and two full adders FA, and in other adders 20,30 respectively consisting of three full adders FA. Then NAND gates 1,2,3 receive the adder data S0-S8 and output them in the form of combined data consisting of 3 bits respectively. The output data of the NAND gates 1,2,3 are input into a NOR gate 7 which outputs only the data having a certain level ($A=B$) among the 9-bit input data. Meanwhile, the full adder FA which is connected to a carrier transmitting terminal CY of the adder 30 receives only predetermined data in accordance with the transmitted carriers of the adder 30, and the added output of the full adder FA is input into a NAND gate 4 and NOR gate 8. Then the output data of the full adder FA and the output data of the NOR gate 7 are input into the NAND gate 4 after being inverted by an inverter IN2 which discriminates the magnitudes ($A>B$) of uppermost bits MSB.

Further, the output data of the full adder FA together with the output data of the NOR gate 7 are also input into NOR gate 8 in which the magnitudes ($A<B$) of lowermost bits LSB are discriminated.

Further, the equivalent data and the data of the lowermost bits are also applied to still another NOR gate 9 from which address bits of a certain level are output after being inverted by an inverter IN3.

In the conventional magnitude comparator constituted as described above, if it is made of a serial semiconductor device receiving the data of variable bit numbers, a plurality of the input data have to be discriminated by comparing them bit by bit, thereby making it difficult to operate them.

Further, the above described conventional magnitude comparator is constituted such that the input and output data are handled in a parallel form. Therefore, in a serial input/output semiconductor device, if the bit numbers of the input data or the bit numbers of the internal data is varied, the circuit constitution of the comparator becomes very complicated, while increasing the number of the input gates, and therefore, the integration of the semiconductor device has to be lowered.

SUMMARY OF THE INVENTION

The present invention is intended to overcome the above described disadvantages of the conventional techniques.

Therefore, it is an object of the present invention to provide a serial comparator for discriminating the magnitudes of the input data by comparing them, in which, even in the case where the bit numbers of the input data and the internal data are varied, the serial operation can be performed without being impeded.

It is another object of the present invention to provide a serial comparator which is capable of comparing the input data with internal data and outputting uppermost bits MSB and lowermost bits LSB.

In achieving the above objects, the serial comparator for deciding the command implementation requirement by comparing the input data with internal data according to the present invention includes a comparator for outputting lowermost bit values LSB and a comparator for outputting uppermost bit values MSB. The comparator for outputting the lowermost bits LSB according to the present invention comprising NOR gates for logic-evaluating two input data based on the two input data values and output values obtained through an exclusive NOR gate, an inverter and a NAND gate as control values, latching circuits comprising two NOR gates for outputting latched outputs after receipt of the outputs of the NOR gates, two inverters for inverting the outputs from the latching circuits, and a NOR gate for outputting the equivalent values from the lowermost bit values after receipt of the two inverted outputs from the two inverters.

The comparator for outputting the uppermost bit values MSB comprises NOR gates for logic-evaluating two input data based on the two input data values and using the output obtained through the exclusive NOR gate, the inverter and the NAND gate as the control values, latching circuits comprising two NOR gates and for outputting the latched outputs after receipt of the outputs of the NOR gates, inverters for inverting the outputs from the latching circuits, a NOR gate for outputting equivalent values from the uppermost bit values after receipt of the two outputs from the inverters, and means for feeding back the outputs from the NOR gate as the control values for the NAND gate.

BRIEF DESCRIPTION OF THE DRAWINGS

The above objects, features, and other advantages of the present invention will become more apparent by describing in detail the preferred embodiment of the present invention with reference to the attached drawings, in which.

DESCRIPTION OF THE PREFERRED EMBODIMENT

Figure 1:
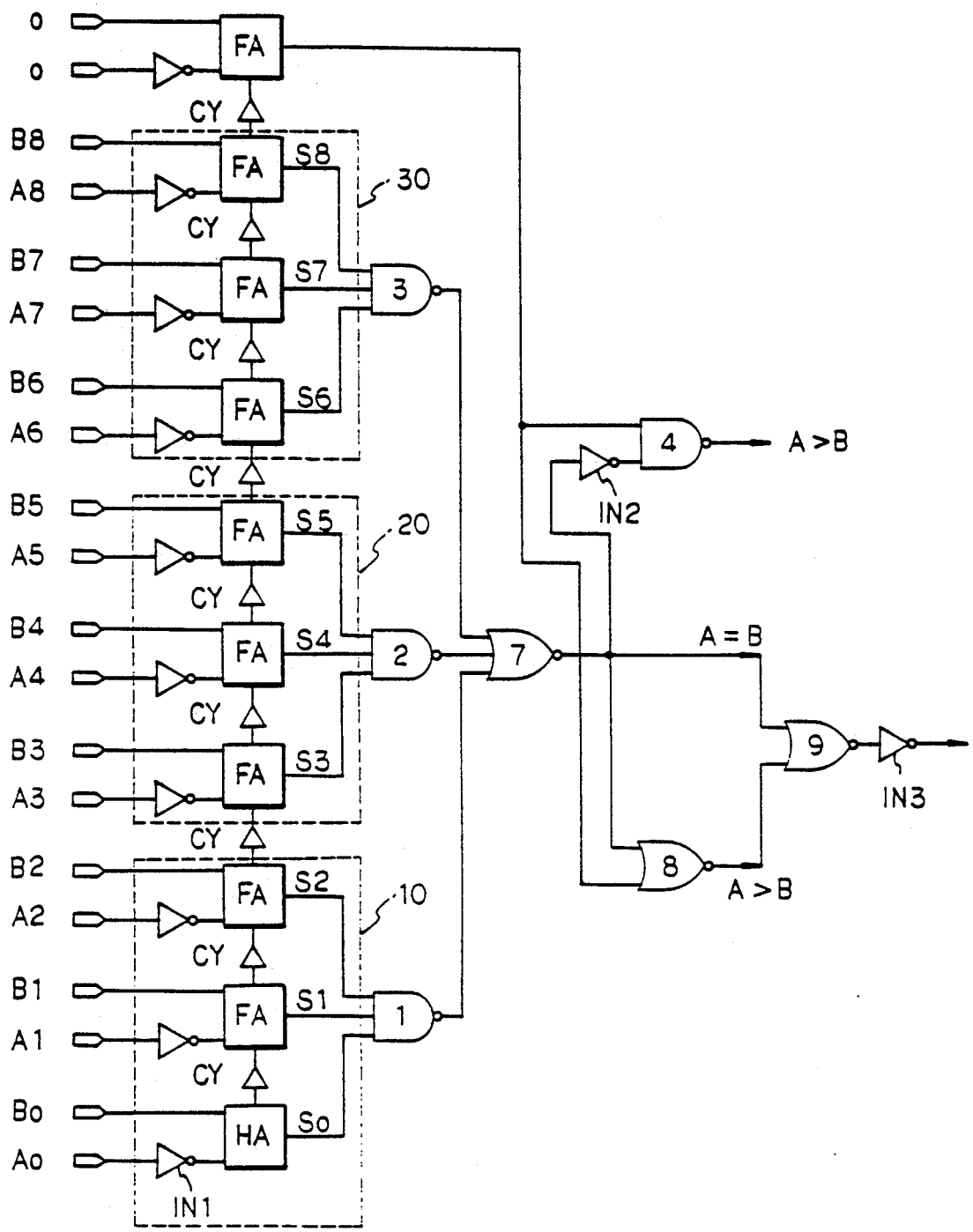
FIG. 1 illustrates the logic circuit of a conventional magnitude comparator.
Figure 2:
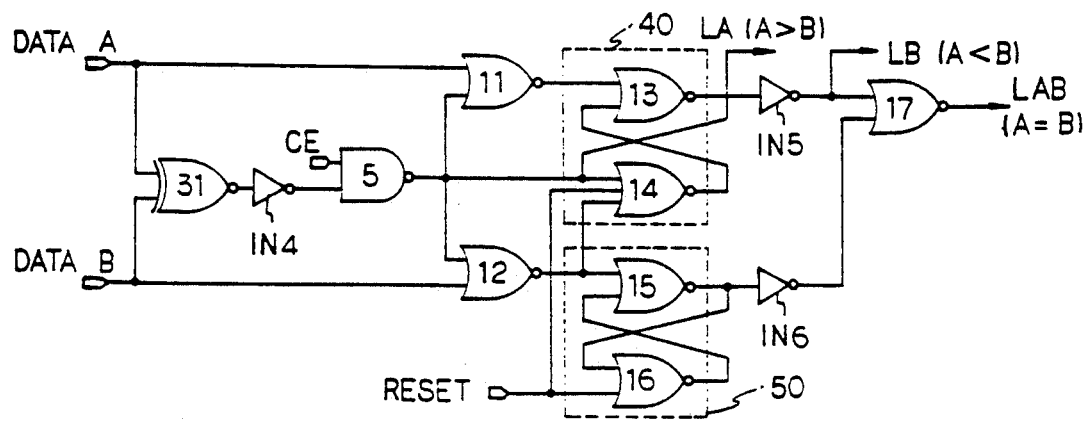
FIG. 2 illustrates the logic circuit of the serial comparator for outputting lowermost bits LSB according to the present invention.

FIG. 2 illustrates the logic circuit of the serial comparator for carrying out the data after receipt of the data from the lowermost bits LSB according to the present invention.

Figure 4A:
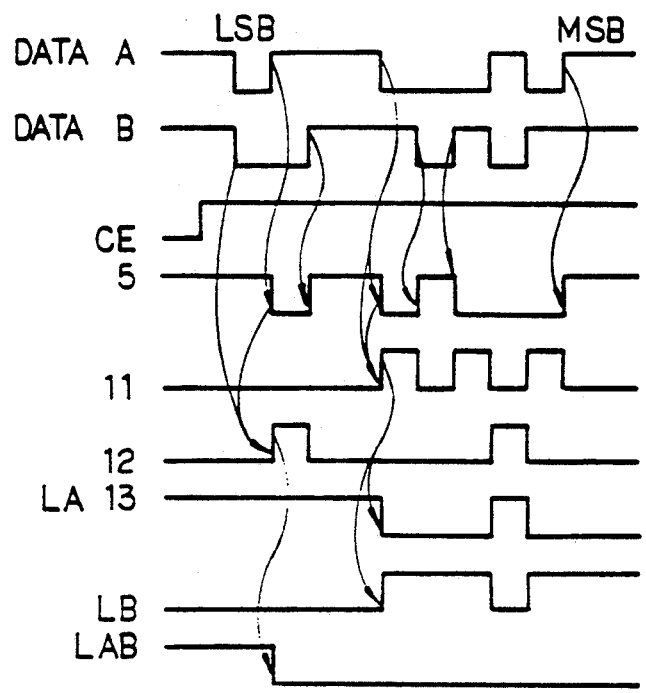
FIGS. 4A and 4B are timing charts for the logic circuits of FIGS. 2 and 3.

Referring to FIG. 2 and the timing chart of FIG. 4A, two input data (DA,DB) of the lowermost bits LSB are input into NOR gates 11,12. The input data pass through an exclusive NOR gate 31, an inverter IN4 and a NAND gate 5, and then, the output therefrom is applied to the NOR gates 11,12 as control values. The value of a check enable CE which is input into NAND gate 5 has a high level, and, in the case where the data values (DA,DB) from the lowermost bits LSB have the same level, the NOR gates 11,12 will output the same level data. Therefore, only the case where the input data has different levels will be described.

If the input data (DA,DB) has different levels in the form of "1" and "0", the output from the NOR gate 11 has a low level, while the output from the NOR gate 12 has a high level. The output data from the NOR gates 11,12 are applied to latching circuits 40 and 50, respectively, the latching circuit 40 comprising NOR gates 13,14, and the latching circuit 50 comprising NOR gates 15,16. The output from the latching circuit 40 is set to a high level in accordance with the reset value (high level), and therefore, the value A of the lowermost bits LSB becomes larger than the value B (A>B), while, if it passes through an inverter IN5, the value A becomes smaller than the value B (A<B). Further, the output from the latching circuit 50 is set to a low level in accordance with the reset value, and it is shifted to a high level after passing through an inverter IN6. Further, the outputs from the latching circuits 40,50 are applied to a NOR gate 17, and the output from the NOR gate 17 is shifted to a low level, thereby showing the data DA,DB from the lowermost bits differently from each other (A≠B) (refer to the timing charts of FIG. 4a for MA and MB).

Meanwhile, in the case where the next input data DA,DB is different from each other in the form of "1" and "0", the output from the NOR gate 11 has a low level, while the output from the NOR gate 12 has a high level. Thus, as described above, the output from the latching circuit 40 is set to a high level, so that the lowermost bit value A is larger than the value B (A>B).

Meanwhile, in the case where the two input data DA,DB are the same up to the uppermost bit MSB, the latching circuits 40,50 are put in a reset state, and the output from the NOR gate 17 is shifted to a high level, so that the two data are the same as each other (A=B).

Figure 3:
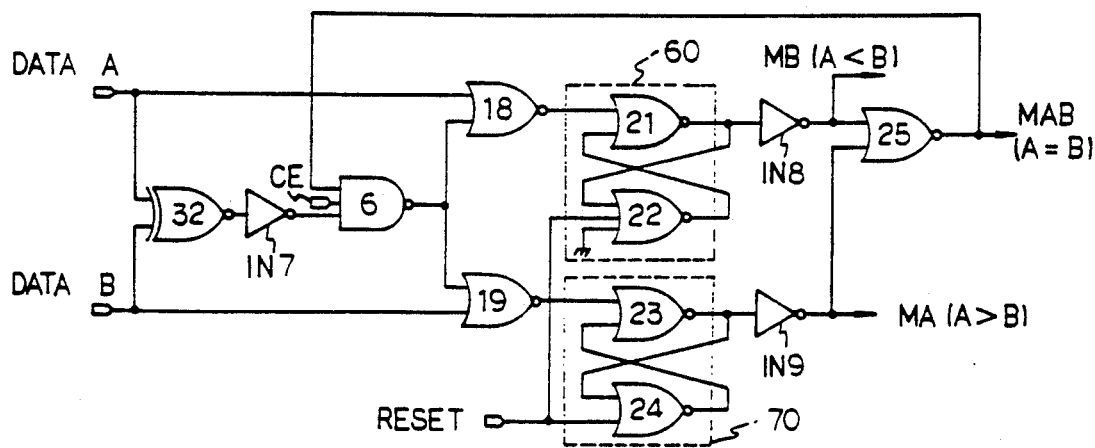
FIG. 3 illustrates the logic circuit of the serial comparator for outputting uppermost bits MSB according to the present invention.

FIG. 3 illustrates the output logic circuit of the serial comparator for comparing the inputs from the uppermost bits MSB according to the present invention.

Figure 4B:
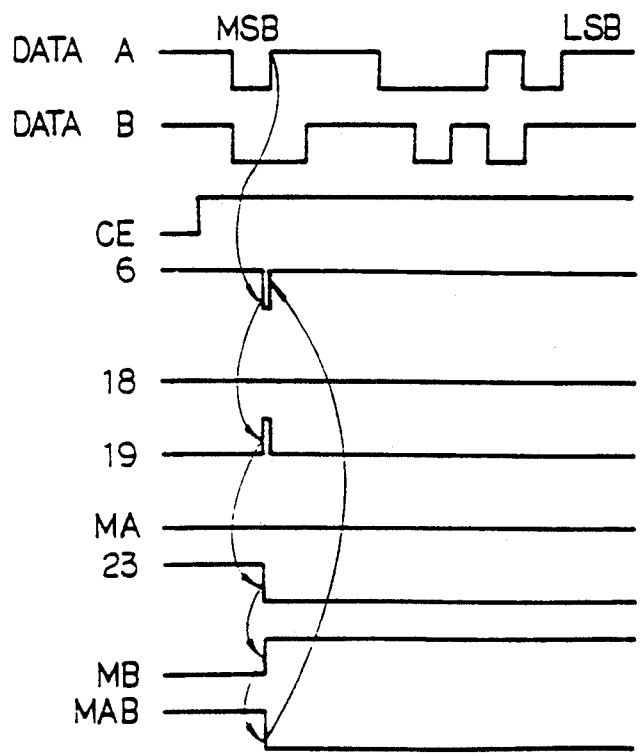

Referring to FIG. 3 and the timing chart of FIG. 4B, two input data (DA,DB) from the uppermost bits MSB are input in series into NOR gates 18,19. The input data DA,DB passes through an exclusive NOR gate 32, an inverter IN7 and a NAND gate 6 having 3 input terminals and connected to NOR gates 18,19 to supply the control values.

Among the values input into the NAND gate 6, the value of the check enable CE has a high level, and the feedback values which are fed back from a NOR gate 25 become high level in accordance with the reset status of latching circuits 60,70.

In the case where the output data from the NOR gates 18,19 have the same level, the system is put into a standby state, and therefore, only the case where the outputs are different from each other will be described.

In the case where the data values DA,DB are different from each other in the form of "1" and "0", the output from the NOR gate 18 has a high level, while the output from the NOR gate 19 will have a low level. The output data from the NOR gates 18,19 are applied to the latching circuits 60,70 respectively comprising of NOR gates 21,22, and NOR gates 23,24. Under this condition, the outputs from the latching circuits 60,70 can have high levels in accordance with the reset values. These outputs are set to a low level after passing through an inverter IN8, so that the value A of the uppermost bits MSB is smaller than the value B (A<B).

Further, the output from the latching circuit 70 can have a high level in accordance with the reset value, and is set to a low level after passing through an inverter IN9, so that the value A of the uppermost bits MSB is larger than the value B (A>B). The latched values as the outputs from the latching circuits are supplied through the inverters IN8,IN9 to the NOR gate 25, from which uppermost address bits MAB are output.

However, in the case where the data values DA,DB input from the uppermost bits MSB are different from each other in the form of "1" and "0", the output from the NAND gate 6 is set to a high state in accordance with the output "0" from the NOR gate 25 after the comparison of the magnitudes of the input data, and therefore, the data input down to the lowermost bit LSB are not subjected to comparisons any more.

Thus according to the present invention, the serial comparator discriminates the magnitudes of the two data values input either from the uppermost bits MSB or from the lowermost bits LSB and uses the discriminated data as an address for determining the command implementation requirement of the semiconductor device.

The serial comparator of the present invention as described above is suitable for a semiconductor device for carrying out the input or output of data serially. Therefore, even in the case where the bit numbers of the input data and the internal data are variable, the characteristics of the semiconductor device is preferable to the serial operating characteristics. Further, it contributes to improving the integration due to the reduction of the number of the gates.

What is claimed is:

1. A serial comparator for comparing two serially input data signals to produce a control signal, said comparator comprising:

two NOR gates having respective first input terminals for receiving respective serially input data signals;

an exclusive NOR gate having two input terminals respectively receiving said input data signals, an inverter connected to an output terminal of said exclusive NOR gate, and a NAND gate having one input terminal connected to an output terminal of said inverter and a second input terminal receiving a check enable signal, said NAND gate having an output terminal connected to respective second input terminals of said two NOR gates;

two latching circuits connected to output terminals of said two NOR gates;

two further inverters connected to respective output terminals of said two latching circuits; and a further NOR gate having input terminals connected to respective output terminals of said two further inverters for producing an output, control signal.

2. A serial comparator as claimed in claim 1, for comparing lowermost bit values in the two input data signals, the output terminal of said NAND gate being connected to one of said latching circuits.

3. A serial comparator as claimed in claim 2, wherein each said latching circuit comprises two additional NOR gates having input terminals, one input terminal of one of said two additional NOR gates of each latching circuit being respectively connected to the output terminal of the associated one of the first said two NOR gates.

4. A serial comparator as claimed in claim 3, wherein the other of said two additional NOR gates in each latching circuit has an output terminal connected to a second input terminal of said one additional NOR gate of the same latching circuit, the additional NOR gate in said one of said latching circuits which is connected to said output terminal of said NAND gate having a further input terminal connected to the output terminal of that one of the first said two NOR gates which is connected to the other of said latching circuits.

5. A serial comparator as claimed in claim 2, wherein each said latching circuit comprises two additional NOR gates connected to each other to pass lowermost bit values of said input data signals based on magnitudes of the outputs at said output terminals of the first said two NOR gates.

6. A serial comparator as claimed in claim 1, for comparing uppermost bit values in the two input data signals said further NOR gate having an output terminal connected to feedback the output signal to a further input terminal of said NAND gate.

7. A serial comparator as claimed in claim 6, wherein each said latching circuit comprises two additional NOR gates having input terminals, one input terminal of one of said two additional NOR gates of each latching circuit being respectively connected to the output terminal of the associated one of the first said two NOR gates.

8. A serial comparator as claimed in claim 7, wherein the other of said two additional NOR gates in each latching circuit has an output terminal connected to a second input terminal of said one additional NOR gate of the same latching circuit, the output terminal of each said one of the two additional NOR gates in each latching circuit being connected to a further input terminal of the other of the two additional NOR gates in the same latching circuit.

9. A serial comparator as claimed in claim 6, wherein each said latching circuit comprises two additional NOR gates connected to each other to pass uppermost bit values of said input data signals based on magnitudes of the outputs at said output terminals of the first said two NOR gates.

* * * * *